United States Patent
Sharafi

(10) Patent No.: US 11,928,140 B2
(45) Date of Patent: *Mar. 12, 2024

(54) METHODS AND SYSTEMS FOR MODIFYING A SEARCH RESULT

(71) Applicant: Comcast Cable Communications, LLC, Philadelphia, PA (US)

(72) Inventor: Kalila Sharafi, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,765

(22) Filed: Aug. 22, 2022

(65) Prior Publication Data

US 2022/0405312 A1 Dec. 22, 2022

Related U.S. Application Data

(63) Continuation of application No. 16/213,725, filed on Dec. 7, 2018, now Pat. No. 11,442,972.

(51) Int. Cl.
*G06F 16/00* (2019.01)
*G06F 16/33* (2019.01)
*G06F 16/332* (2019.01)
*G06F 16/9538* (2019.01)

(52) U.S. Cl.
CPC ...... *G06F 16/3325* (2019.01); *G06F 16/3334* (2019.01); *G06F 16/3344* (2019.01); *G06F 16/9538* (2019.01)

(58) Field of Classification Search
None
See application file for complete search history.

(56) References Cited

U.S. PATENT DOCUMENTS

| | | | |
|---|---|---|---|
| 6,598,039 B1 | 7/2003 | Livowsky | |
| 8,316,039 B2 | 11/2012 | Vanderwende | |
| 8,862,610 B2 | 10/2014 | Cheng | |
| 9,104,750 B1* | 8/2015 | Dhamdhere | G06F 16/3322 |
| 9,342,601 B1 | 5/2016 | Finkelstein | |
| 9,754,034 B2 | 9/2017 | Chilakamarri | |
| 9,767,169 B1* | 9/2017 | Paff | G06F 16/9038 |
| 10,223,426 B2 | 3/2019 | Wadley | |
| 10,394,841 B2 | 8/2019 | Denman | |
| 10,474,704 B2* | 11/2019 | Kikuchi | G06F 16/3322 |
| 10,565,268 B2 | 2/2020 | Winnemoeller | |
| 10,762,118 B2 | 9/2020 | Tripathi | |
| 10,803,055 B2 | 10/2020 | Sirotkovic | |
| 11,238,118 B2 | 2/2022 | Murphy | |
| 2006/0271353 A1 | 11/2006 | Berkan et al. | |
| 2008/0201242 A1 | 8/2008 | Minnis et al. | |
| 2012/0117102 A1* | 5/2012 | Meyerzon | G06F 16/3322 707/765 |
| 2014/0359598 A1 | 12/2014 | Oliver | |
| 2017/0220680 A1* | 8/2017 | Shattuck | G06F 16/951 |
| 2017/0242900 A1 | 8/2017 | Denman | |
| 2018/0089322 A1 | 3/2018 | DeLuca | |
| 2020/0110842 A1* | 4/2020 | Teo | G06F 16/24575 |
| 2020/0117758 A1 | 4/2020 | Lu | |

\* cited by examiner

*Primary Examiner* — Debbie M Le
(74) *Attorney, Agent, or Firm* — Ballard Spahr LLP

(57) ABSTRACT

Methods and systems for modifying a search result are described. A computing device may receive a query. A search result based on the query may be determined. The computing device may modify the search result based on a term of the query.

28 Claims, 9 Drawing Sheets

710 RECEIVE A SEARCH QUERY AND AN INDICATION OF A USER PROFILE

720 DETERMINE A SEARCH RESULT

730 DETERMINE A TERM OF THE SEARCH RESULT THAT IS CONTEXTUALLY RELATED TO A TERM OF THE SEARCH QUERY

740 DETERMINE A MODIFIED SEARCH RESULT

750 CAUSE OUTPUT OF THE MODIFIED SEARCH RESULT

METHODS AND SYSTEMS FOR MODIFYING A SEARCH RESULT

CROSS-REFERENCE TO RELATED PATENT APPLICATION

This is a continuation of U.S. patent application Ser. No. 16/213,725, filed on Dec. 7, 2018, which is hereby incorporated by reference in its entirety.

BACKGROUND

A user may utilize a search function to search for desired information, such as a search engine or a search function associated with a website, and the search function may present results that are most likely to provide the desired information to the user. However, the results of the search may use words or terminology that are unfamiliar to the user or that are different from the words the user entered as a query. Thus, the user may not know if the search results actually provide the desired information, or if the search function merely provided a search result that is irrelevant to the user.

SUMMARY

It is to be understood that both the following general description and the following detailed description are exemplary and explanatory only and are not restrictive. Methods and systems are described for modifying search results. A user may submit a query to a search function of a computing device, and the computing device may determine a search result(s) based on the query. Text of the search result(s) (e.g., hyperlinks or other text indicative of a search result) may be modified based on the query to provide the user the search result in terms the user may better understand. Thus, while a query for "internet not working" may generate search results related to cable modems, personal computing devices, wireless routers, and the like, the text of the search results (e.g., titles of the results, hyperlinks, descriptions for the results, etc.) may be modified to more closely align with the query. A search result having text such as "cable modem" may be replaced with "internet not working," "internet solutions," or the like. Artificial Intelligence (AI), such as machine learning and/or natural language processing, may be utilized to determine one or more terms to modify. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems:

FIG. 7 shows a flowchart of a method for modifying terminology.

DETAILED DESCRIPTION

Figure 1:
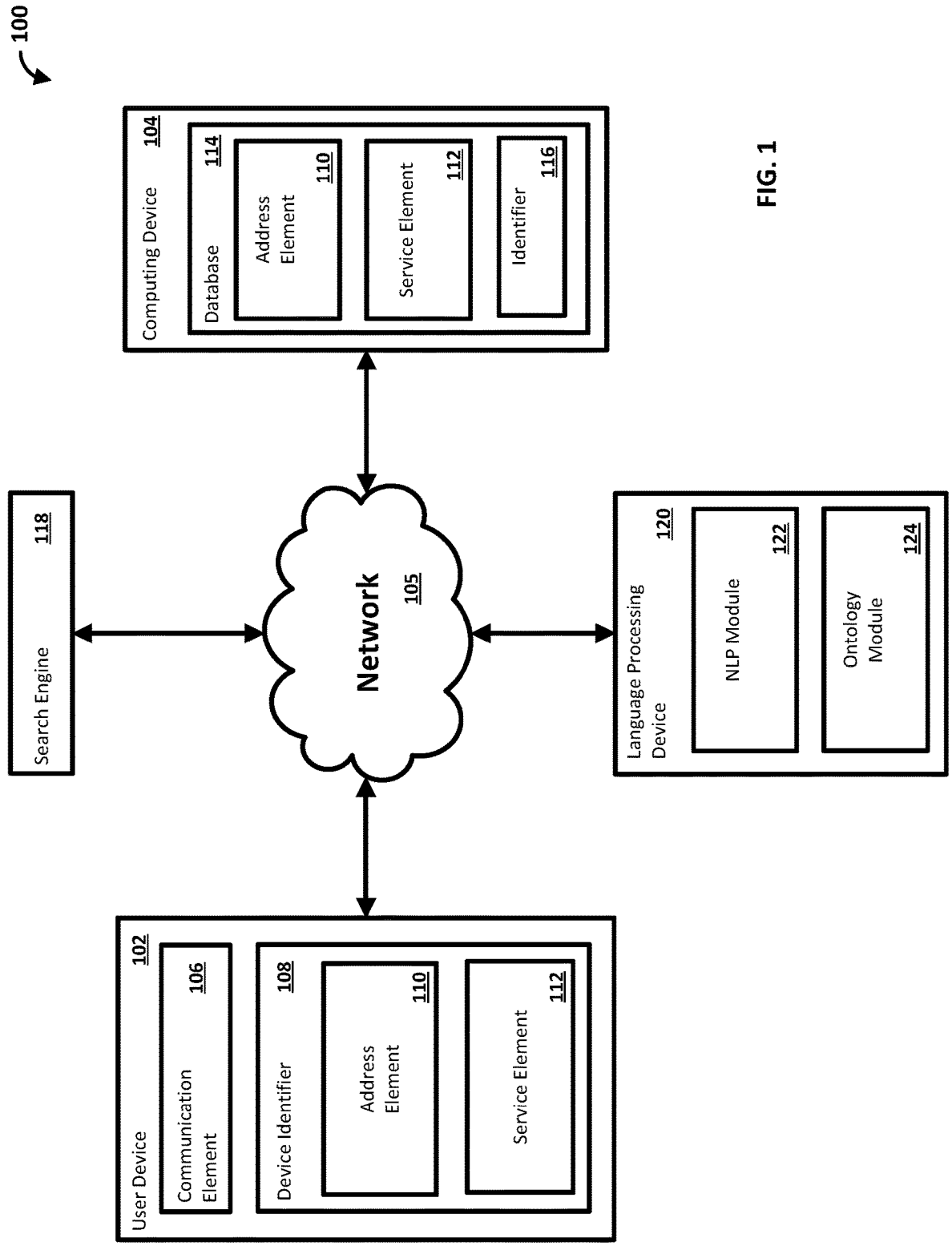
FIG. 1 shows a system for modifying terminology.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Search engines provide a powerful tool for locating documents, files or information, such as the documents, files, or websites on the World Wide Web (WWW), or the documents or files stored on the computers of an intranet. The documents, files, or websites are located in response to a search query submitted by a user via a user device. A search query may include one or more search terms or phrases. After the search query is received, the search engine processes the search query, searches for documents, files, or websites responsive to the search query, and returns a list of search results (e.g., documents, files, websites, etc.) to the user. The search results may take many forms. Each search result may have text (e.g., a title, a snippet about the search result, a hyperlink, etc.) that describes the search result. The text of the search results are typically derived from the documents, files, or websites of the search results. A website describing how to reboot a cable modem may have a search result having text such as a title of "Rebooting a cable modem," a hyperlink that indicates the location of the search result, and a snippet that provides a brief summary of the search result. The text of the search result (e.g., a title, a snippet about the search result, a hyperlink, etc.) may be modified prior to output (e.g., presentation on a display device or other output device). The text of the search result may be modified to reflect the keywords of the search query, rather than (or in addition to) the text indicative of the document, file, or website. The text of the search result may be substituted for one or more keywords of the search query.

The text of the search results (e.g., a title, a snippet about the search result, a hyperlink, etc.) may be dynamically modified (e.g., replaced) based on terms in the search query. Artificial Intelligence (AI) may be utilized for determining the search results, as well as for determining whether to modify the search results. The AI may determine whether to modify the text of the search results based on one or more characteristics associated with a user that submitted the query. The characteristics may be stored in a user profile associated with the user. The AI may determine one or more of the characteristics and/or preferences of the user over time based on the user's search history. The AI may utilize machine learning and/or Natural Language Processing (NLP) to determine one or more terms in the text of the search results that are contextually related with one or more terms of the submitted query. That is, the AI may understand that the terms "cable box" and "TV" have the same contextual meaning to a user. The contextual meaning may be based on vernacular associated with the user and/or a region where the user may be located. The AI may modify the search results based a query submitted by a user.

If a user submits a query such as "My cable box isn't working," or "My settop isn't showing video," or "My TV isn't working," the search engine may determine one or more search results associated with the submitted query. The text of the search results (e.g., a title, a snippet about the search result, a hyperlink, etc.) may be modified by determining words in the text of the search results that are contextually related to the underlined terms, and replacing the contextually related words with the underlined terms. In this manner, the search results may be modified based on terms of the submitted query to provide search results that match the terms submitted by the user. Content other than search results may be modified based on the user. Ads and metadata associated with a website may be changed based on one or more characteristics of the user that submitted the query.

The AI may improve (e.g., learn) over time based one or more characteristics of the user submitting the query. The AI may modify the search results based on the user's demographics, past search queries submitted by the user, the user's interaction with the search results, and so forth. The AI may learn that the modified search results were successful based on a user interacting with (e.g., clicking on) a search result, and the AI may strengthen the contextual relationship between the terms. Alternatively, the AI may learn that the modified terms were unsuccessful based on a user submitting a new query without interacting with any of the search results, and the AI may weaken the contextual relationship between the terms.

FIG. 1 shows a system 100 that may be configured to provide services, such as search services, to a user device 102. The system 100 may have a user device 102, a computing device 104, a search engine 118, and/or a language processing device 120. The user device 102 may be in communication with a computing device 104 such as a server. The computing device 104 may be disposed locally or remotely relative to the user device 102. The user device 102 and the computing device 104 may be in communication via a private and/or public network 105 such as the Internet or a local area network. Other forms of communications may be used such as wired and wireless telecommunication channels.

The user device 102 may be an electronic device such as a computer, a smartphone, a laptop, a tablet, a set top box, a display device, or other device capable of communicating with another device (e.g., the computing device 104, the search engine 118, and/or the language processing device 120). The user device 102 may comprise a communication element 106 for providing an interface to a user to interact with the user device 102, the computing device 104, the search engine 118, and/or the language processing device 120. The communication element 106 may be any interface for presenting and/or receiving information to/from the user, such as search queries and/or search results. The communication element 106 may be an interface such as a web browser (e.g., Internet Explorer®, Mozilla Firefox®, Google Chrome®, Safari®, or the like) for accessing webpages and/or websites. Other software, hardware, and/or interfaces may be used to provide communication between the user and one or more of the user device 102, the computing device 104, the search engine 118, and/or the language processing device 120. The communication element 106 may request or query various files from a local source and/or a remote source such as the computing device 104, the search engine 118, and/or the language processing device 120. The communication element 106 may submit (e.g., to the computing device 104, the search engine 118, and/or the language processing device 120) a query for a search. The query may comprise one or more terms. The communication element 106 may transmit data to a local or remote device such as the computing device 104, the search engine 118, and/or the language processing device 120. The communication element 106 may send the query (e.g., to the computing device 104, the search engine 118, and/or the language processing device 120).

The user device 102 may be associated with a user identifier or a device identifier 108. The device identifier 108 may be any identifier, token, character, string, or the like, for differentiating one user or user device (e.g., the user device 102) from another user or user device. The device identifier 108 may identify a user or user device as belonging to a particular class of users or user devices. The device identifier 108 may comprise information relating to the user device such as a manufacturer, a model or type of device, a service provider associated with the user device 102, a state of the user device 102, a locator, and/or a label or classifier. Other information may be represented by the device identifier 108.

The device identifier 108 may be associated with a user profile. A user of the user device 102 may provide the user device 102 with demographic information (e.g., location, age, etc.) and/or preferences associated with the user. The user device 102 may use the information provided by the user to create and/or maintain the user profile associated with the user. The user profile may indicate preferred terms and/or words of the user associated with the user profile. Each user of the user device 102 may have a different user profile, and the different user profiles may have different information reflecting the different users. The user device 102 may use the user profile associated with the device identifier 108 to submit a query (e.g., to the computing device 104, the search engine 118, and/or the language processing device 120). The query may include the user profile so that a device and/or service receiving the query and the user profile (e.g., the computing device 104, the search engine 118, and/or the language processing device 120) may utilize the user profile in executing the query.

The device identifier 108 may comprise an address element 110 and a service element 112. The address element 110 may comprise or provide an internet protocol address, a network address, a media access control (MAC) address, an Internet address, or the like. The address element 110 may be relied upon to establish a communication session between the user device 102 and the computing device 104, the search engine 118, the language processing device 120, or other devices and/or networks. The address element 110 may be used as an identifier or locator of the user device 102. The address element 110 may be persistent for a particular network. The address element 110 may indicate a location associated with the user device 102. The address element 110 may indicate a physical location (e.g., Global Positioning System (GPS) coordinate, mailing address, state, region, country, etc.) of the user device 102.

The service element 112 may comprise an identification of a service provider associated with the user device 102 and/or with the class of user device 102. The class of the user device 102 may be related to a type of device, capability of device, type of service being provided, and/or a level of service (e.g., business class, service tier, service package, etc.). The service element 112 may comprise information relating to or provided by a communication service provider (e.g., an Internet Service Provider (ISP)) that is providing or enabling data flow such as search services to the user device 102. The service element 112 may comprise information relating to a preferred service provider for one or more particular services relating to the user device 102. The address element 110 may be used to identify or retrieve data from the service element 112, or vice versa. The address element 110 and/or the service element 112 may be stored remotely from the user device 102 and retrieved by one or more devices such as the user device 102, the computing device 104, the search engine 118, and/or the language processing device 120. Other information may be represented by the service element 112.

The computing device 104 may be a server for communicating with the user device 102. The computing device 104 may communicate with the user device 102 for providing data and/or services. The computing device 104 may provide services such as network (e.g., Internet) connectivity, network printing, media management (e.g., media server), content services, streaming services, broadband services, or other network-related services. The computing device 104 may allow the user device 102 to interact with remote resources such as data, devices, and files. The computing device 104 may be configured as (or disposed at) a central location (e.g., a headend, processing facility, etc.), which may receive content (e.g., data, content, input programming, etc.) from multiple sources.

The computing device 104 may manage the communication between the user device 102 and a database 114 for sending and receiving data therebetween. The database 114 may store a plurality of files (e.g., webpages), user identifiers or records, or other information. The database 114 may store user profiles associated with a user of the user device 102. The user device 102 may request and/or retrieve a file from the database 114. The database 114 may store information relating to the user device 102 such as the address element 110 and/or the service element 112. The computing device 104 may obtain the device identifier 108 from the user device 102 and retrieve information from the database 114 such as the address element 110 and/or the service elements 112. The computing device 104 may obtain the address element 110 from the user device 102 and may retrieve the service element 112 from the database 114, or vice versa. Any information may be stored in and retrieved from the database 114. The database 114 may be disposed remotely from the computing device 104 and accessed via direct or indirect connection. The database 114 may be integrated with the computing device 104 or some other device or system.

The database 114 may store one or more identifiers 116 associated with one or more devices (e.g., the user device 102, the computing device 104, the search engine 118, and/or the language processing device 120). One or more identifiers may be, or relate to, an Internet Protocol (IP) Address IPV4/IPV6 or a media access control address (MAC address) or the like. One or more identifiers 116 may be a unique identifier for facilitating communications on the network 105. Each of the devices may comprise a distinct identifier 116. The identifiers 116 may be associated with a physical location of the devices.

The computing device 104 may provide search services to the user device 102. The computing device 104 may provide search services for searching the database 114. The user device 102 may send a search query to the computing device 104 via the network 105. The search query may be one or more keywords, terms, phrases, questions, natural language queries, concepts, combinations thereof, and the like. The search query may have one or more search query terms. The computing device 104 may receive the search query from the user device 102. The computing device 104 may execute a search based on the search query. The computing device 104 may execute a search based on the search query terms. The computing device 104 may send the search query to another device and/or service (e.g., the search engine 118 and/or the language processing device 120) via the network 105 to execute the search. The computing device 104 may determine search results and/or receive the search results from the another device and/or service, and send the search results of the search query to the user device 102. Each of the search results may have text. The text of the search results may be one or more of a title, a snippet, and/or a hyperlink. The computing device 104 may modify the search results. The computing device 104 may modify the text of the search results. The computing device 104 may modify the search results prior to sending the search results to the user device 102. The computing device 104 may modify the text of the search results prior to sending the search results to the user device 102. The computing device 104 may modify the text of the search results based on one or more terms of the search query. The computing device 104 may modify the text of the search results to include one or more terms of the search query. The computing device 104 may replace at least a portion of the text of the search results with one or more terms of the search query. The computing device 104 may replace a term in the text of the search result with a contextually related term of the search query. The computing device 104 may send the modified search results to the user device 102.

The search engine 118 may provide search results based on a search query. The search engine 118 may receive a search query from a device (e.g., the user device 102 and/or the computing device 104). The search query may have one or more keywords, terms, phrases, questions, natural language queries, concepts, combinations thereof, and the like. The search query may include one or more search query terms. The search engine 118 may provide search results based on the search query terms. The search results may have text (e.g., a title, a snippet about the search result, a hyperlink, etc.). The search engine 118 may filter search results received from another search engine. The search engine 118 may retrieve and analyze electronic documents (e.g., websites) to determine how to index the electronic documents. Data about the electronic documents may be stored in the search engine 118 for use in queries by the search engine 118. The search engine 118 may use the language processing device 120 to perform language processing on the search query terms to assist in performing searches.

The search engine 118 may provide one or more search results based on the search query. A search result may have text. The text of the search result may comprise a title, a snippet, and/or a hyperlink. Each search result may be associated with an electronic document and/or website. The website may reside on the network 105 (e.g., the Internet) and may be a collection of one or more webpages, which are electronic documents that may be coded in HTML. The webpages may be linked to each other and/or may be linked to webpages on other websites. A website may be hosted on a website owner's server or on an Internet Service Provider (ISP) server. A website may share space on a server with other websites, may reside on a computing device (e.g., the computing device 104) dedicated to that website only, or may be on multiple dedicated computing devices 104.

The webpage may have one or more ads. The ads may be determined based on a user profile associated with a user. The ads may be directed toward the user associated with the user profile based on one or more characteristics of the user. The ads may have text comprising one or more terms. The text of the ads may be modified based on the user profile. The user profile may have a plurality of terms associated with the user. The text of the ads may be modified based on the plurality of terms associated with the user.

The search engine 118 may perform one or more types of searches. The search engine 118 may perform a keyword search. A keyword search may be a type of search that looks for matching documents (e.g., electronic files, websites, etc.) that contain one or more words specified by a user.

The search engine 118 may determine one or more of a domain-level link feature, a page-level link feature, a page-level keyword feature, a page-level content-based feature, a page-level keyword-agnostic feature, engagement data, traffic/query data, domain-level brand metrics, domain-level keyword usage, domain-level keyword-agnostic feature, page-level social metrics, and combinations thereof. The search engine 118 may use the aforementioned features to determine a relevance of a potential search result (e.g., a website). The domain-level link feature may be based on link/citation metrics such as quantity of links, trust, domain-level PageRank, etc. The page-level link feature may be based on PageRank, trust metrics, quantity of linking root domains, links, anchor text distribution, quality (or lack thereof) of linking resources, etc. The page-level keyword feature and/or the page-level content-based feature may be based on content relevance scoring, on-page optimization of keyword usage, topic-modeling algorithm scores on content, content quantity/quality/relevance, etc. The page-level keyword-agnostic feature may be based on content length, readability, Open Graph markup, uniqueness, load speed, structured data markup, HTTPS, etc. The engagement data and/or the traffic/query data may comprise Search Engine Results Pages (SERP) engagement metrics, clickstream data, visitor traffic/usage signals, quantity/diversity/CTR of queries, both on the domain and the page level. The domain-level brand metrics may be based on offline usage of brand/domain name, mentions of brand/domain in news/media/press, toolbar/browser data of site usage, entity association, etc. The domain-level keyword usage may be based on exact-match keyword domains, partial-keyword matches, etc. The domain-level keyword-agnostic feature may be based on domain name length, TLD extension, SSL certificate, etc. The page-level social metrics may be based on quantity/quality of tweeted links, Facebook shares, etc., to the page.

The search engine 118 may perform a semantic search. The semantic search may improve search accuracy by understanding searcher intent and the contextual meaning of terms as the terms appear in the searchable dataspace, whether on the Web or within a closed system, to generate more relevant results. A semantic search technique may be used to build a semantic model from a set of documents (e.g., websites, emails, documents on a file system, etc.). The semantic model may be used to determine search results based on the semantics of a user. The semantic model may be able to determine search terms based on the vernacular of a user. The semantic model may be specific to an individual user or may be associated with a group and/or class of users. The semantic model may be associated with a specific user.

The semantic model may be modified based on traits and/or characteristics of users. The users may have vernacular that may be regionally distinct (e.g., has a different meaning) than vernacular of users of a different region. A user from a first region may refer to soda generally as "coke," whereas a user from a second region may refer to soda generally as "pop." The semantic model may determine the aforementioned distinction, and may build a separate semantic model for each region. The semantic model may be modified based on each user. Stated differently, each user may have a specific semantic model associated with the user that may be modified and/or updated over time to accurately reflect and/or indicate the semantics and/or vernacular of the user. The semantic model may be associated with a user profile that may be associated with a user.

The search engine 118 may modify one or more search results based on the semantic model. The search engine 118 may determine the one or more search results based on a search query submitted by a user. The search engine 118 may modify text of the search results based on the semantic model to provide search results in vernacular associated with the semantic model. The semantic model may indicate one or more terms that are more familiar and/or preferred with a user who submitted the search query. The search engine 118 may modify the term "sub sandwich" located in text of a search result (e.g., the title, the snippet, the hyperlink, etc.) to the term "hoagie" if the semantic model indicates the user would be more familiar with and/or prefer the term "hoagie" over "sub sandwich." Thus, the search engine 118 may modify the search results based on the semantic model.

The search engine 118 may provide search services to the user device 102, the computing device 104, and/or the language processing device 120. The user device 102, the computing device 104, and/or the language processing device 120 may send a search query to the search engine 118 via the network 105. The search query may be one or more keywords, terms, phrases, questions, natural language queries, concepts, combinations thereof, and the like. The search query may have one or more search query terms. The search engine 118 may receive the search query from the user device 102, the computing device 104, and/or the language processing device 120. The search engine 118 may execute a search based on the search query. The search engine 118 may determine search results, and send the search results of the search query to the user device 102, the computing device 104, and/or the language processing device 120. Each of the search results may have text. The text of the search results may be a title, a snippet, and/or a hyperlink. The search engine 118 may modify the search results. The search engine 118 may modify the search results prior to sending the search results to the user device 102, the computing device 104, and/or the language processing device 120. The search engine 118 may modify text of the search results based on one or more terms of the search query. The search engine 118 may replace a term in the text of the search result with a contextually related term of the search query. The search engine 118 may send the modified search results to the user device 102, the computing device 104, and/or the language processing device 120.

While the search engine 118 is shown as being external to the user device 102, the computing device 104, and the language processing device 120 for ease of explanation, a person skilled in the art would appreciate that the user device 102, the computing device 104, and/or the language processing device 120 may include the capabilities of the search engine 118.

The language processing device 120 may have a Natural Language Processing (NLP) module 122 and an ontology module 124. The language processing device 120 may receive a request and may execute a search based on the request. The request may have one or more terms, and the language processing device 120 may develop a list of related terms, concepts, and/or contexts that may correlate to the one or more terms in the request. The language processing device 120 may provide the list of related terms to another device (e.g., the user device 102, the computing device 104, and/or the search engine 118).

The search engine 118 may communicate with the language processing device 120. The search engine 118 may use the language processing device 120 to determine one or more terms of a query. The search engine 118 may send a query to the language processing device 120, and the language processing device 120 may develop a list of related terms that may correlate to information in the query. The language processing device 120 may send the list of related terms to the search engine 118. The search engine 118 may use the list of related terms to execute the search and determine the search results.

The natural language processing (NLP) module 122 may analyze the text of search queries, search results, indexed electronic files, combinations thereof, and the like. The text may be provided to the NLP module 122, and the NLP module 122 may generate a cognitive model of the input text. In other words, a query in natural language may be parsed into the representation format of first-order logic and naive semantics. The NLP module 122 may use statistical techniques to produce a list of candidate terms and a relevance reasoning module (not shown) which may use first-order theorem proving and human-like reasoning to determine which terms should be output based on the submitted query. The text may be based on sentence structure, based on a word-by-word analysis, term-by-term, phrase-by-phrase, and/or a whole sentence analysis.

The ontology module 124 may use a concept-based method for searching text information. The ontology module 124 may communicate with the NLP module 122 to transform a natural language query into predicate structures representing logical relationships between words in the natural language query. The ontology module 124 may have one or more ontologies and/or thesauri containing lexical semantic information about words. The ontology module 124 may use the one or more ontologies and/or thesauri to determine terms that are contextually related. The ontology module 124 may receive a query having one or more terms, and the ontology module 124 may determine one or more related terms based on the query. The ontology module 124 may provide a logical representation and/or a semantic representation for all of the content in an electronic document. The logical representation and/or a semantic representation may be a data profile, a request result, a search result, and/or text.

A thesaurus may be a structured controlled vocabulary. The thesaurus may provide information about each term and the term's relationships to other terms within the same thesaurus. In addition to specifying which terms may be used as synonyms, a thesaurus also indicates which terms are more specific (narrower terms), which are broader, and which are related terms.

An ontology may be a set of concepts with attributes and relationships between the various concepts that have various meanings, all to define a domain of knowledge. The ontology may have a format that is machine-readable. Ontologies may define a domain of knowledge through terms and relationships. An ontology may be a more complex type of thesaurus, in which instead of having simply "related term" relationships, there may be various customized relationship pairs that have specific meaning, such as "owns" and a reciprocal "is owned by."

The ontology module 124 and/or the NLP module 122 may generate one or more data profiles. A data profile may have a list of concepts and/or terms and their associated relevance weights. A weight may indicate an importance of a concept/term with regard to other concepts/terms. The weights may represent the frequency with which the concepts occur in textual information, the specificity of the concepts, statistical characteristics of each concept, the strength of the contextual relationship between terms, and the like. Statistical characteristics of concepts may include, without limitation, the specificity, the sensitivity, the number of alternatives occurring in the textual information, the textual similarity, the contextual relationship, and the like.

The ontology module 124 and/or the NLP module 122 may determine a weight for a concept/term in a data profile. Important terms may have a higher weight than less important terms. Similarly, terms that are contextually related may have higher weights if the contextually related term is more likely to make sense in the sentence or query versus a term that would not make sense. In a comparison with the query "My dog loves playing fetch," the term "puppy" may be given a high weight as being very contextually related to the term "dog", whereas the term "homie," which can be a vernacular term such as "dog" for buddy, may be given a low weight as "homie" would likely not be contextually related to that query. If the ontology module 124 and/or the NLP module 122 are provided a search from a user such as "switch on cable box," the term "cable box" may have a higher weight than the term "switch" because a resource that has "cable box" is more likely to be relevant than the term "switch" due to the variety of ways "switch" may be contextually used.

The ontology module 124 and/or the NLP module 122 may generate a data profile based on a search query. The resulting data profile may be used to identify one or more search results based on a comparison between a query data profile and data profiles of potential search results. An amount of overlap between the query data profile and the data profiles of potential search results may identify relevant search results. Determining an overlap of data profiles among a plurality of data profiles may comprise determining a number of concepts that data profiles have in common. The ontology module 124 and/or the NLP module 122 may determine a similarity score that reflects the similarity between a query data profile and the data profiles of potential search results. The ontology module 124 and/or the NLP module 122 may use the similarity score to determine that the relevance of potential search results. A high similarity score may indicate the potential search results are very relevant based on the requested search. A low similarity score may indicate that the potential search results are irrelevant.

The ontology module 124 and/or the NLP module 122 may use a user profile to track characteristics of a user. The user profile may be associated with a specific user. The user profile may be associated with a specific class of users. The ontology module 124 and/or the NLP module 122 may customize the user profile over time. That is, the ontology module 124 and/or the NLP module 122 may learn characteristics of the user over time, and store the information associated with the characteristics of the user in the user profile. The characteristics may be preferred terms, age, location, and so forth. The ontology module 124 and/or the NLP module 122 may use the user profile to personalize search results for the user. The user profile may indicate how to weight different terms, how to define a similarity and/or contextual score based on the user profile, or any personalization that may assist the ontology module 124 and/or the NLP module 122 in determining terms for the user associated with the user profile.

The language processing device 120 may provide search services to the user device 102, the computing device 104, and/or the search engine 118. The user device 102, the computing device 104, and/or the search engine 118 may send a search query to the language processing device 120 via the network 105. The search query may be one or more keywords, terms, phrases, questions, natural language queries, concepts, combinations thereof, and the like. The search query may have one or more search query terms. The language processing device 120 may receive the search query from the user device 102, the computing device 104, and/or the search engine 118. The language processing device 120 may execute a search based on the search query. The language processing device 120 may determine search results, and send the search results of the search query to the user device 102, the computing device 104, and/or the search engine 118. Each of the search results may have text. The text of the search result may be one or more of a title, a snippet, and/or a hyperlink. The language processing device 120 may modify the search results. The language processing device 120 may modify the text of the search results. The language processing device 120 may modify the search results prior to sending the search results to the user device 102, the computing device 104, and/or the search engine 118. The language processing device 120 may modify the text of the search results based on one or more terms of the search query. The language processing device 120 may replace a term in the text of the search result with a contextually related term of the search query. The language processing device 120 may send the modified search results to the user device 102, the computing device 104, and/or the search engine 118.

While the language processing device 120 is shown as being external to the user device 102, the computing device 104, and the search engine 118 for ease of explanation, a person skilled in the art would appreciate that the user device 102, the computing device 104, and/or the search engine 118 may include the capabilities of the language processing device 120.

Figure 2:
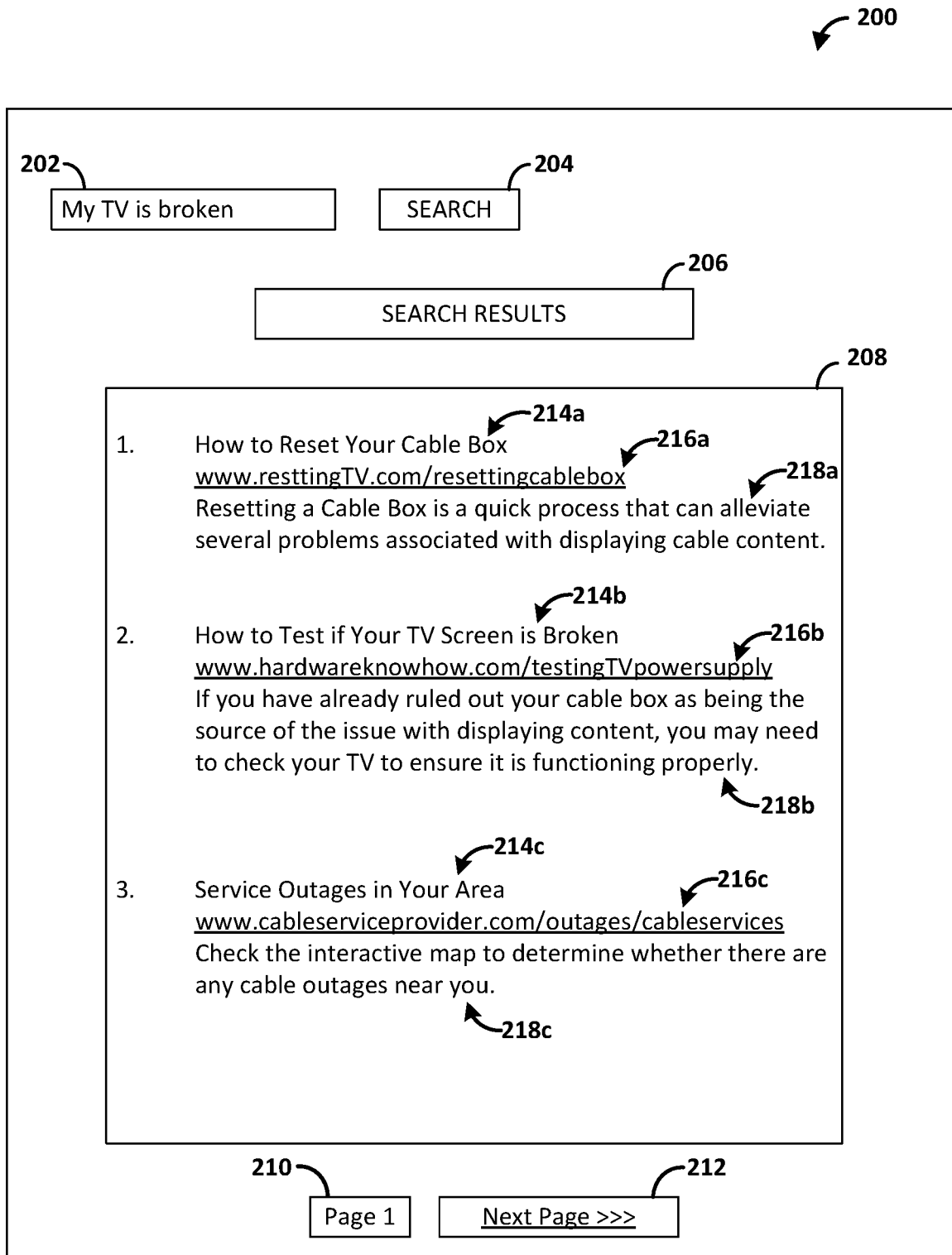
FIG. 2 shows a user interface for search results.

FIG. 2 shows a user interface 200 for search results. The user interface 200 may be a visual representation of a web page. The user interface 200 may have a search bar 202, a search button 204, a search results header 206, a listing of search results 208, a page indicator 210, and a page navigation button 212. A user of a user device (e.g., the user device 102 of FIG. 1) may provide an input to the search bar 202. The input may be one or more terms of a query. The user may interact with the search button 204 to indicate that the user desires to execute the query. The user may interact with the search button 204 and, in response, the user device may send a query that has the one or more terms within the search bar 202 to a computing device (e.g., the computing device 104, the search engine 118, and/or the language processing device 120 of FIG. 1) to determine one or more search results 208. The computing device may send the query to a search engine (e.g., the search engine 118 of FIG. 1) to execute the query. That is, the search engine 118 may perform a search based on the one or more terms of the query to determine the search results 208. The search engine 118 may provide the search results 208 to the computing device (e.g., the computing device 104). The computing device may provide the search results to the user device (e.g., the user device 102). The user device may cause display of the search results 208 via the user interface 200.

Each of the search results 208 may have text. The text of the search results may be a title 214, a hyperlink 216, and/or a snippet 218. The title 214 of the search result indicates a heading or label for the respective search result. The title 214 may be based on a title associated with a website or electronic document. The title 214 may be determined from metadata stored within the website or electronic document that indicates the title for the website or electronic document. The hyperlink 216 may indicate the location of the search result. The hyperlink 216 may be a Uniform Resource Locator (URL) that indicates the location to retrieve a website and/or electronic document associated with the search result. If the hyperlink 216 is selected, the user interface 200 may be replaced with the website and/or electronic document associated with the hyperlink 216.

The snippet 218 may be a brief summary of the website and/or electronic document associated with the search result. The snippet 218 may provide the user with a brief overview of the website associated with the search result in order to provide the user with information to allow the user to determine whether the search result is relevant to the user. The snippet 218 may be determined from metadata associated with the electronic document (e.g., a website). The metadata may indicate a summary and/or snippet section, which may then be utilized as the snippet 218. The snippet 218 may be determined by searching (e.g., scraping) the website. That is, the website may be searched for key terms (e.g., the one or more terms of the query) to determine one or more portions of the website that match the query terms. The one or more portions of the website may be provided as the snippet 218.

The user may submit a query for "My TV is broken" in the search box 202. The search results 208 may provide three search results 208 that may provide an answer to the user's query. Specifically, the first search result has a title 214a of "How to Reset Your Cable Box." The hyperlink 216a may indicate the location of a website associated with the first search result. The first search result also may have a snippet 218a. The snippet 218a may provide a brief summary of the website associated with the first search result. Specifically, the snippet 218a may indicate that "Resetting a Cable Box is a quick process that can alleviate several problems associated with displaying cable content."

The second search result has a title 214b of "How to Test if Your TV Screen is Broken." The hyperlink 216b may indicate a website associated with the location of the second search result. The second search result also may have a snippet 218b. The snippet 218b may provide a brief summary of the website associated with the second search result. Specifically, the snippet 218b may indicate that "If you have already ruled out your cable box as being the source of the issue with displaying content, you may need to check your TV to ensure it is functioning properly."

The third search result has a title 214c of "Service Outages in Your Area." The hyperlink 216c may indicate the location of a website associated with the third search result. The third search result also may have a snippet 218c. The snippet 218c may provide a brief summary of the website associated with the third search result. Specifically, the snippet 218c may indicate that "Check the interactive map to determine whether there are any cable outages near you."

The search results 208 may be relevant to the search terms (e.g., "my TV is broken") submitted in the query via the search box 202, but a user may not recognize the search results 208 as being relevant because the search results may have language the user who submitted the query is not familiar with. The user may not know that a "Cable Box" may be a device that provides cable to the user's TV. Thus, the user may incorrectly assume that "How to Reset your Cable Box" is an irrelevant search result that the user may ignore.

Figure 3:
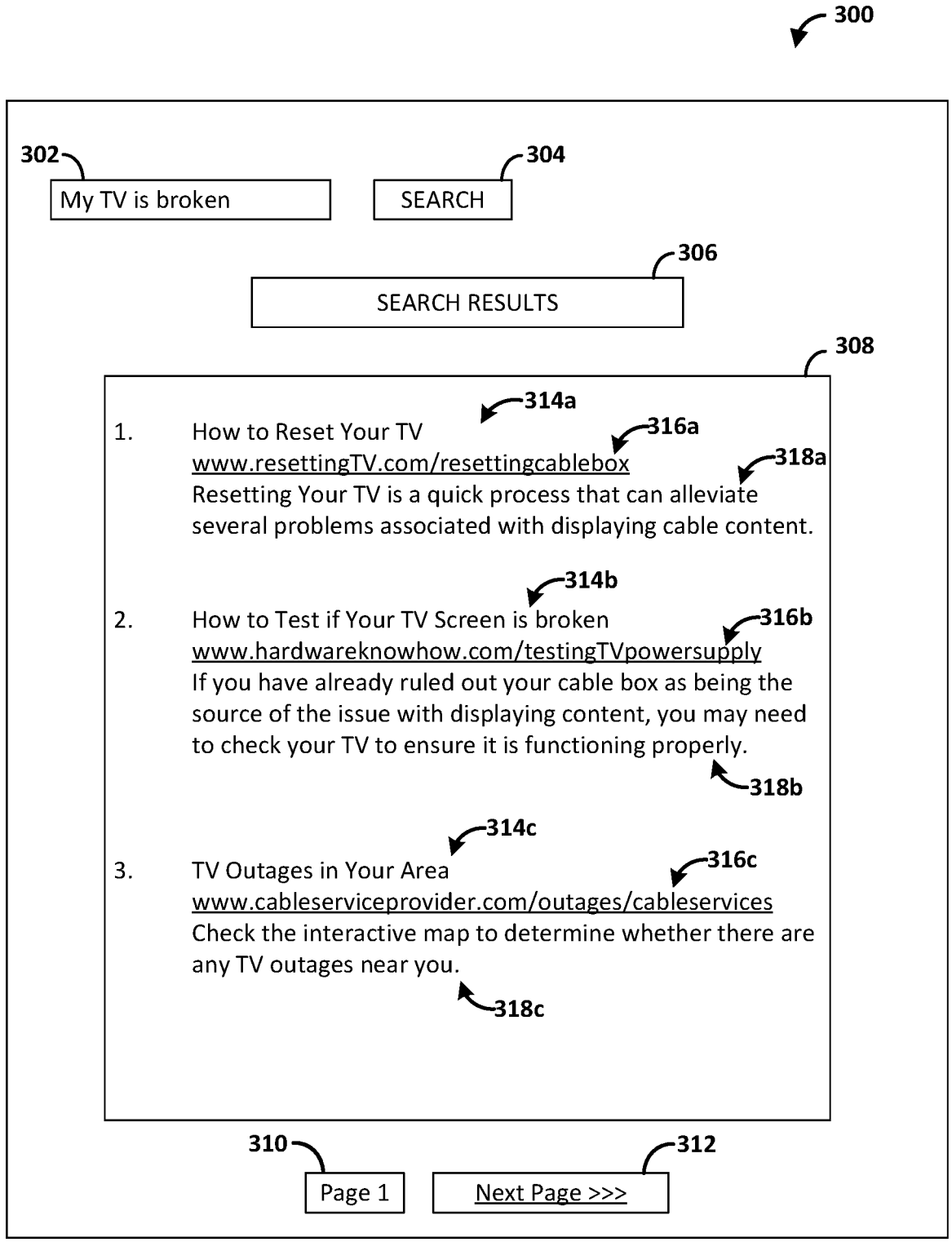
FIG. 3 shows a user interface for search results.

FIG. 3 shows a user interface 300 for search results. The user interface 300 may be a visual representation of a web page. The user interface 300 may have a search bar 302, a search button 304, a search results header 306, a listing of search results 308, page indicator 310, and a page navigation button 312. The user interface 300 follows the user interface 200 of FIG. 2, but the search results 308 are modified from the search results 208 of FIG. 2.

The user may interact with the search button 304 to indicate that the user desires to execute the query. The user may interact with the search button 304 and, in response, the user device may send a query that has the one or more terms within the search bar 302 to a computing device (e.g., the computing device 104 of FIG. 1) to determine one or more search results 308. The computing device may send the query to a search engine (e.g., the search engine 118 of FIG. 1) to execute the query. That is, the search engine may perform a search based on the one or more terms of the query to determine the search results 308. The search engine may provide the search results 308 to the computing device. The computing device may provide the search results 308 to a language processing device (e.g., the language processing device 120 of FIG. 1). Alternatively, the search engine may provide the search results 308 directly to the language processing device.

The language processing device may receive the search results 308. The language processing device may modify the search results 308 based on the query submitted via the search bar 302. The language processing device may analyze the query to determine one or more terms of the query. The language processing device may use the one or more terms of the query to determine one or more contextually related words in the text of search results 308. The language processing device may modify the search results 308 to replace the one or more contextually related words in the text of the search results 308 with the one or more terms of the query. The language processing device may provide the modified search results 308 to the computing device. The computing device may provide the modified search results to the user device. The user device may cause display of the modified search results 308 via the user interface 300. The user device may have the capability of the language processing device. That is, the user device may receive unmodified search results, and modify the search results prior to causing output of the search results.

The search results 308 may be modified based on one or more terms of the query and/or a profile associated with the user executing the search. The user profile may indicate characteristics, demographics, and/or preferences of the user. The user profile may indicate terms that the user associated with the user profile prefers. That is, the user profile may indicate that the user does not prefer the term "Cable Box," but rather the user prefers the term "TV." The search results may be modified to provide text that the user may prefer (e.g., replacing text of the search results 308 that has the term "Cable Box" with the word "TV").

The user profile may indicate the user is not technically savvy and may not understand technical terms associated with determining issues with the user's TV. That is, the user profile may indicate that the user may not know that a "Cable Box" is a device that provides cable service to an output device. Thus, the search results may be modified to provide results that the user may better understand (e.g., replacing text of the search results 308 that have the term "Cable Box" with the word "TV"). The user interface 300 may also have ads (not shown) and/or metadata associated with the user interface 300.

The user interface 300 may also have ads (not shown) and/or metadata associated with the user interface 300. The ads and/or the metadata may be modified based on the user profile and/or the query submitted via the search bar 302. The user interface 300 may be dynamically modified. The user device may dynamically modify the search results 308 as the user device receives the search results 308.

The user may submit a query for "My TV is broken" in the search box 302. The search results 308 has three search results 308 that may provide an answer to the user's search. Specifically, the first search result has a title 314a of "How to Reset Your TV." The title 314a has been modified as compared to the title 214a of FIG. 2 which recites "How to Reset Your Cable Box." The term "Cable Box" has been replaced with the term "TV" prior to causing output of the search results 308. Thus, the title 314a may be modified based on the query submitted by the user via the search box 302. Similarly, the snippet 318a may be modified to recite "Resetting Your TV is a quick process that can alleviate several problems associated with displaying cable content" as compared to the snippet 218a of FIG. 2 which recites that "Resetting a Cable Box is a quick process that can alleviate several problems associated with displaying cable content." Thus, the snippet 318a may be modified based on the query submitted by the user via the search box 302. The hyperlink 316a may not be modified as compared to the hyperlink 216a because the hyperlink 316a comprises a URL pointing to a specific location of the search result and modifying the hyperlink 316a may result in a non-working hyperlink. Text that indicates the hyperlink 316a may be modified as the text that indicates the hyperlink 316a may not impact the functioning of the hyperlink 316a. That is, the text of the hyperlink 316a may be modified from "www.resettingTV.com/resettingcablebox" to "www.resettingTV.com/resettingTV" to appear more relevant to the user, but the actual hyperlink may remain "www.resettingTV.com/resetting-cablebox" so that if the user selects the hyperlink 316a the hyperlink works as intended.

The second search result has a title 314b of "How to Test if Your TV Screen is Broken." The hyperlink 316b may indicate the location of the second search result. The second search result also may have a snippet 318b. The snippet 318b may provide a brief summary of the second search result. Specifically, the snippet 318b may indicate that "If you have already ruled out your cable box as being the source of the issue with displaying content, you may need to check your TV to ensure it is functioning properly." The second search result may not be modified as compared to the second search result of FIG. 2 because the search result already has a term of the query (e.g., TV) and does not contain any additional contextually related terms to be modified.

The third search result has a title 314c of "TV Outages in Your Area." The title 314c has been modified as compared to the title 214c of FIG. 2 which recites "Service Outages in Your Area." The term "Service" has been replaced with the term "TV" prior to causing output of the search results 308. Thus, the title 314c may be modified based on the query submitted by the user via the search box 302. Similarly, the snippet 318c may be modified to recite "Check the interactive map to determine whether there are any TV outages near you." as compared to the snippet 218c of FIG. 2 which recites that "Check the interactive map to determine whether there are any cable outages near you." Thus, the snippet 318b may be modified based on the query submitted by the user via the search box 302. The hyperlink 316c may not be modified as compared to the hyperlink 216c because the hyperlink comprises a URL pointing to a specific location of the search result and modifying the hyperlink may result in a non-working hyperlink. Text that indicates the hyperlink 316c may be modified as the text that indicates the hyperlink 316c may not impact the functioning of the hyperlink 316c.

Figure 4:
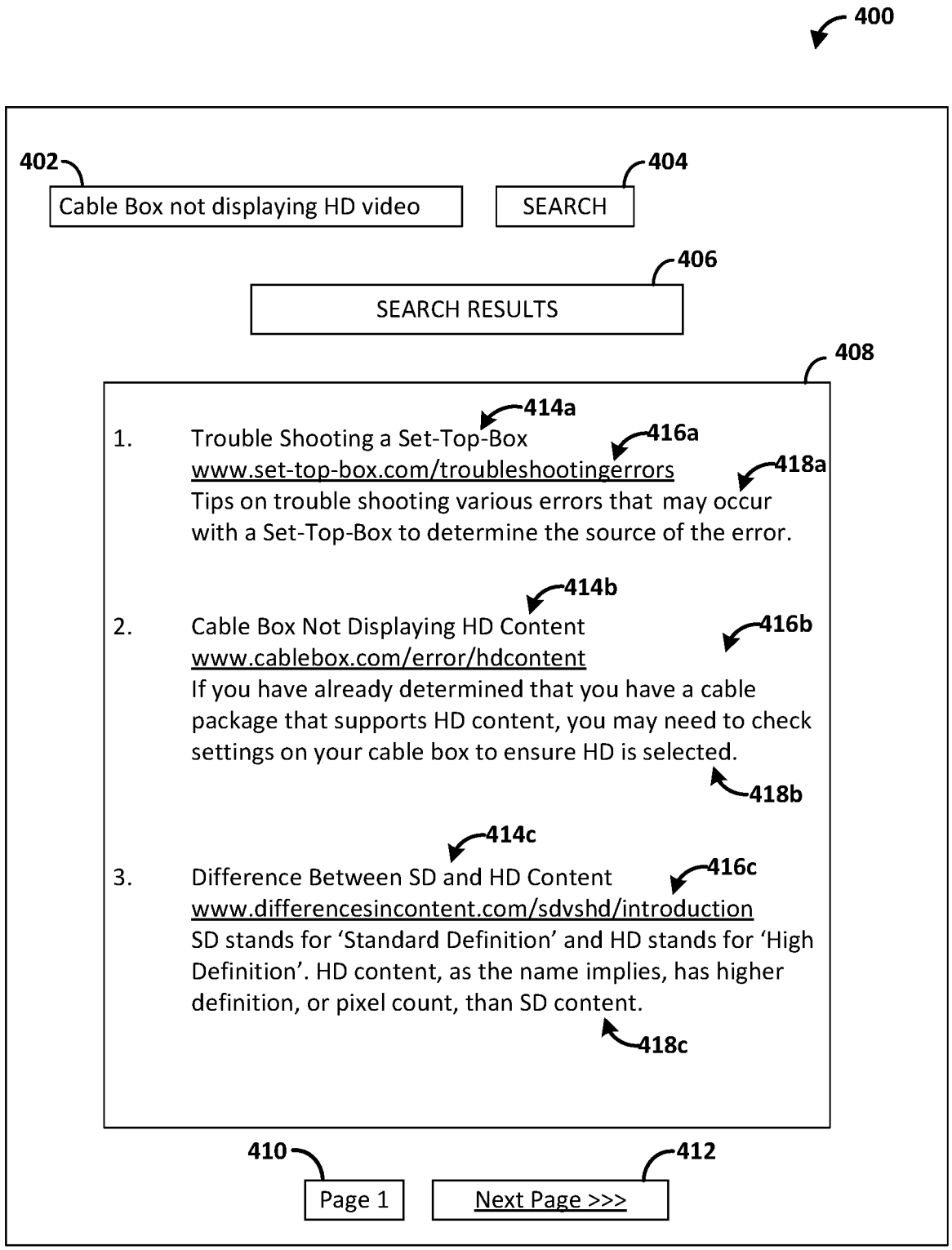
FIG. 4 shows a user interface for search results.

FIG. 4 shows a user interface 400 for search results. The user interface 400 may be a visual representation of a web page. The user interface 400 may have a search bar 402, a search button 404, a search results header 406, a listing of search results 408, page indicator 410, and a page navigation button 412. The user interface 400 is similar to the user interface 200 of FIG. 2 and the user interface 300 of FIG. 3.

The user may submit a query for "Cable Box not displaying HD video" in the search box 402. The search results 408 provide three search results 408 that may provide an answer to the user's search. Specifically, the first search result has a title 414a of "Trouble Shooting a Set-Top-Box." The hyperlink 416a may indicate the location of the first search result. The first search result also may have a snippet 418a. The snippet 418a may provide a brief summary of the first search result. Specifically, the snippet 418a may indicate that "Tips on trouble shooting various errors that may occur with a Set-Top-Box to determine the source of the error."

The second search result has a title 414b of "Cable Box Not Displaying HD Content." The hyperlink 416b may indicate the location of the second search result. The second search result also may have a snippet 418b. The snippet 418b may provide a brief summary of the second search result. Specifically, the snippet 418b may indicate that "If you have already determined that you have a cable package that supports HD content, you may need to check settings on your cable box to ensure HD is selected."

The third search result has a title 414c of "Difference Between SD and HD Content." The hyperlink 416c may indicate the location of the third search result. The third search result also may have a snippet 418c. The snippet 418c may provide a brief summary of the third search result. Specifically, the snippet 418c may indicate that "SD stands for 'Standard Definition' and HD stands for 'High Definition'. HD content, as the name implies, has higher definition, or pixel count, than SD content."

The search results 408 may be relevant to the search terms (e.g., "Cable Box Not Displaying HD Content") submitted in the query via the search box 402, but the search results 408 may not be relevant to the user who submitted the query. The user may know the difference between Standard Definition and High Definition content. Thus, the third search result may not be relevant to the user who submitted the query.

Figure 5:
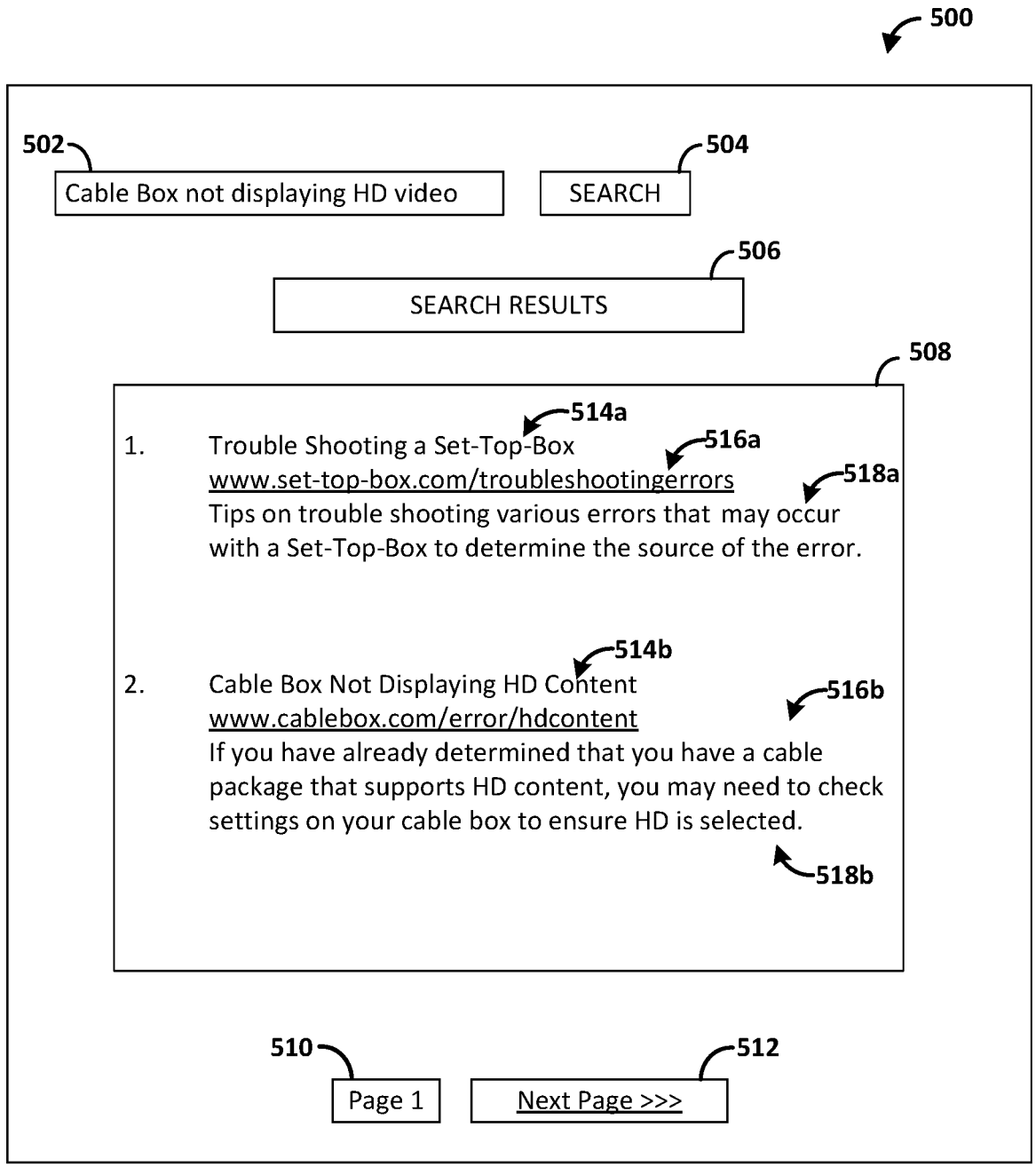
FIG. 5 shows a user interface for search results.

FIG. 5 shows a user interface 500 for search results. The user interface 500 may be a visual representation of a web page. The user interface 500 may have a search bar 502, a search button 504, a search results header 506, search results 508, page indicator 510, and a page navigation button 512.

The user interface 500 follows the user interface 400 of FIG. 4, but the search results 508 are modified from the search results 408 of FIG. 4.

The search results 508 have one fewer search result than the search results 408. Specifically, the search result 508 related to "Difference between SD and HD Content" has been removed from the search results 508. The one or more terms of the query and/or a profile associated with the user may indicate the user is technologically savvy. The search results 508 may be modified based on the user being technologically savvy. Thus, the computing device (e.g., the user device 102 and/or the computing device 104 of FIG. 1) may determine that the user's technical acumen indicates that the search result 508 "Difference between SD and HD Content" is irrelevant to the user. The search result 508 may be irrelevant to the user because the computing device may determine the user would not find the search result 508 helpful given the requested search terms and the user profile. A user with a high technical acumen may know what the differences are between SD and HD content, and if the user desired that search result 508, the user would have used search terms that more closely align with that search result. Thus, the computing device may determine to remove and/or hide search results from a user based on the user profile. The computing device may determine to add additional search results based on the user profile.

Figure 6:
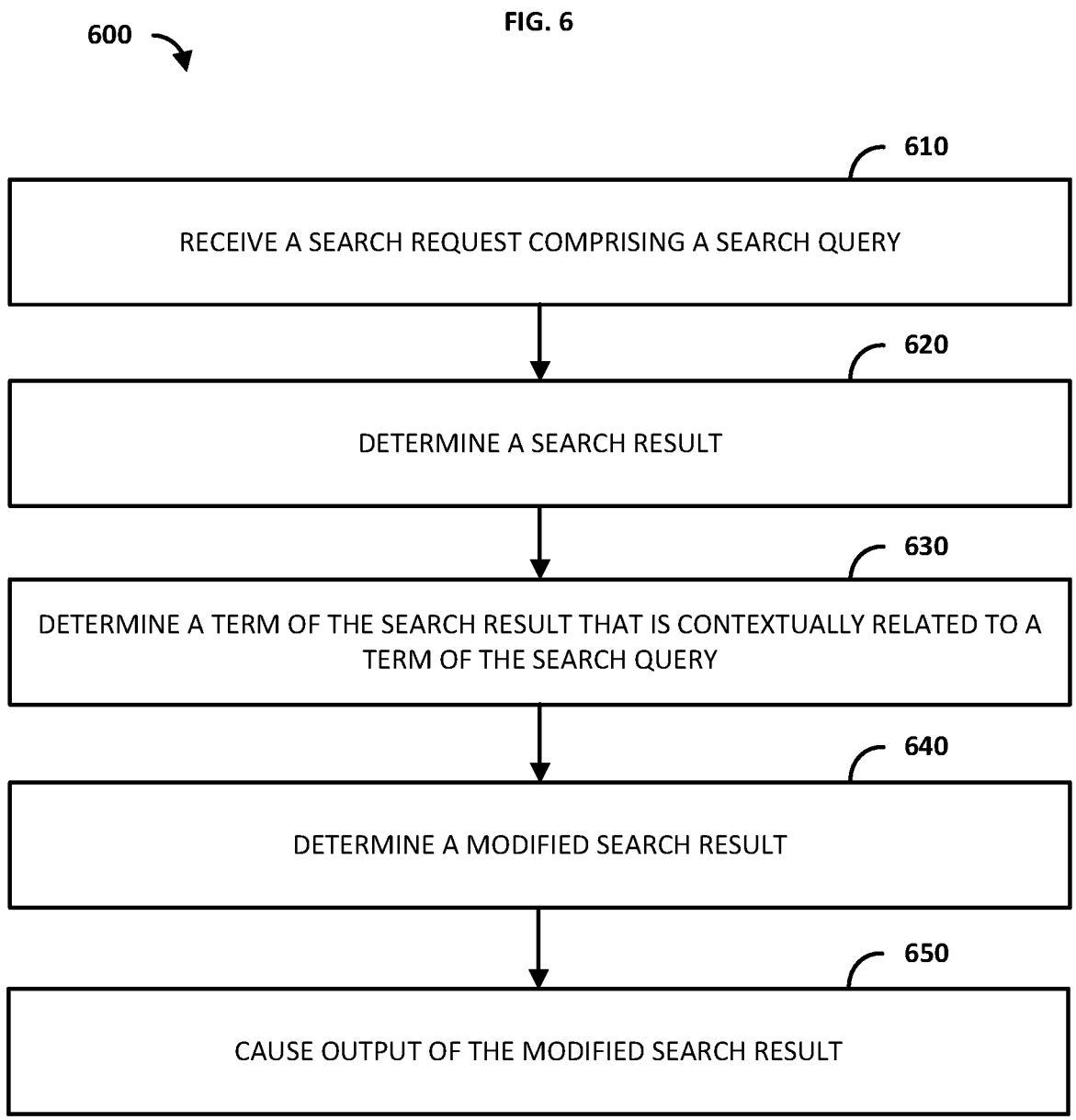
FIG. 6 shows a flowchart of a method for modifying terminology.

FIG. 6 shows a flowchart of a method 600 for modifying terminology. At step 610, a search request comprising a search query may be received by a computing device (e.g., the user device 102, the computing device 104, the search engine 118, and/or the language processing device 120 of FIG. 1). The search query may have one or more terms. The search request may indicate a user profile associated with the device sending the request (e.g., the user device 102). The user profile may indicate one or more characteristics and/or preferences associated with the user.

At step 620, a search result may be determined. The search result may be determined by a computing device (e.g., by the user device 102, the computing device 104, the search engine 118, and/or the language processing device 120 of FIG. 1). The search result may be based on the one or more search terms. The search result may be based on a user profile associated with a user of a device (e.g., the user device 102). A computing device (e.g., the user device 102 and/or the computing device 104) may receive the search request, and send the search request to another device (e.g., the search engine 118 and/or the language processing device 120) to determine the one or more search results. The one or more search results may be based on a user profile associated with a user of a device (e.g., the user device 102).

At step 630, a term of the search result that may be contextually related to a term of the search query may be determined. The term of the search result that may be contextually related to a term of the search query may be determined by a computing device (e.g., by the user device 102, the computing device 104, the search engine 118, and/or the language processing device 120 of FIG. 1). The search result may have one or more terms. The term of the search query may be compared to the one or more terms of the search result (e.g., by the search engine 118 and/or the language processing device 120) to determine if a term of the one or more terms of the search result may be contextually related to the term of the search query. The contextual relationship may be determined by using Natural Language Processing (NLP). The one or more search terms may be determined by comparing the requested term to a database. The database may be an ontology. The ontology may be used to determine that the term of the search result may be contextually related to the term of the search query. A user profile may be used to determine that the term of the search result may be contextually related to the term of the search query. The user profile may indicate characteristics and/or preferences of a user of a user device (e.g., the user device 102).

At step 640, a modified search result may be determined by a computing device (e.g., by the user device 102, the computing device 104, the search engine 118, and/or the language processing device 120 of FIG. 1). The computing device may modify the search result by replacing the term of the search result with the term of the search query. The computing device may modify the text (e.g., a title, a snippet about the search result, a hyperlink, etc.) of the search result.

At step 650, the modified search result may be output by a computing device (e.g., by the user device 102, the computing device 104, the search engine 118, and/or the language processing device 120 of FIG. 1). The computing device may send the modified search result to another device (e.g., the user device 102). The computing device may cause output of the modified search result on a display.

FIG. 7 shows a flowchart of a method 700 for modifying terminology. At step 710, a search query may be received by a computing device (e.g., the user device 102, the computing device 104, the search engine 118, and/or the language processing device 120 of FIG. 1). The search query may have one or more terms. An indication of a user profile may be received. The indication of the user profile may be received before, after, or concurrently with the search query. The search query may indicate the user profile. The user profile may be associated with the device sending the request (e.g., the user device 102). The user profile may be associated with a user of the device sending the request (e.g., the user device 102). The user profile may indicate one or more characteristics and/or preferences associated with the user.

At step 720, a search result may be determined. The search result may be determined by a computing device (e.g., by the user device 102, the computing device 104, the search engine 118, and/or the language processing device 120 of FIG. 1). The search result may be based on the one or more search terms. The search result may be based on a user profile associated with a user of a device (e.g., the user device 102). A computing device (e.g., the user device 102 and/or the computing device 104) may receive the search request, and send the search request to another device (e.g., the search engine 118 and/or the language processing device 120) to determine the one or more search results. The one or more search results may be based on a user profile associated with a user of a device (e.g., the user device 102).

At step 730, a term of the search result that may be contextually related to a term of the search query may be determined. The term of the search result that may be contextually related to a term of the search query may be determined by a computing device (e.g., by the user device 102, the computing device 104, the search engine 118, and/or the language processing device 120 of FIG. 1). The search result may have one or more terms. The term of the search query may be compared to the one or more terms of the search result (e.g., by the search engine 118 and/or the language processing device 120) to determine if a term of the one or more terms of the search result may be contextually related to the term of the search query. The contextual relationship may be determined by using Natural Language Processing (NLP). The one or more search terms may be determined by comparing the requested term to a database.

The database may be an ontology. The ontology may be used to determine that the term of the search result may be contextually related to the term of the search query. A user profile may be used to determine that the term of the search result may be contextually related to the term of the search query. The user profile may indicate characteristics and/or preferences of a user of a user device (e.g., the user device 102).

At step 740, a modified search result may be determined by a computing device (e.g., by the user device 102, the computing device 104, the search engine 118, and/or the language processing device 120 of FIG. 1). The computing device may modify the search result by replacing the term of the search result with the term of the search query. The computing device may modify the text (e.g., a title, a snippet about the search result, a hyperlink, etc.) of the search result. The search result may be modified based on the user profile.

At step 750, the modified search result may be output by a computing device (e.g., by the user device 102, the computing device 104, the search engine 118, and/or the language processing device 120 of FIG. 1). The computing device may send the modified search result to another device (e.g., the user device 102). The computing device may cause output of the modified search result on a display.

Figure 8:
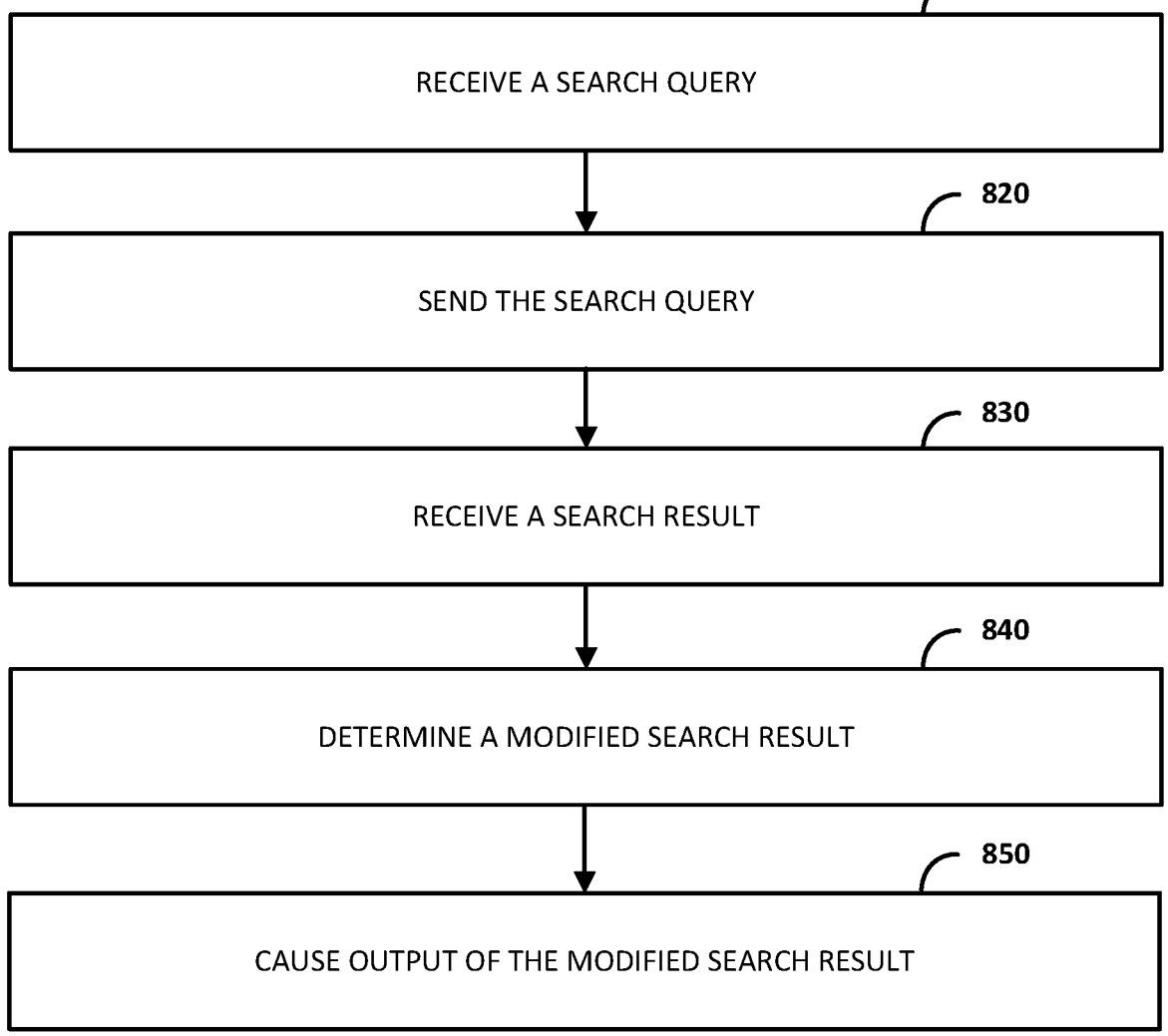
FIG. 8 shows a flowchart of a method for modifying terminology.

FIG. 8 shows a flowchart of a method 800 for modifying terminology. At step 810, a search query may be received by a computing device (e.g., the user device 102, the computing device 104, the search engine 118, and/or the language processing device 120 of FIG. 1). The search query may have one or more terms. The search query may comprise a user profile. The user profile may be associated with the device sending the request (e.g., the user device 102). The user profile may indicate one or more characteristics and/or preferences associated with the user.

At step 820, the one or more search terms are sent to a computing device (e.g., by the user device 102, the computing device 104, the search engine 118, and/or the language processing device 120 of FIG. 1). The computing device may be configured to execute a search (e.g., the search engine 118) by a computing device. (e.g., by the user device 102 and/or the computing device 104). The search engine may send the search results to the computing device.

At step 830, a search result may be received by a computing device (e.g., by the user device 102 of FIG. 1). The search result may be based on the one or more search terms. The search result may be based on a user profile associated with a user of a device (e.g., the user device 102).

At step 840, a modified search result may be determined by the user device (e.g., by the user device 102). The user device may determine a first term of the search result that may be contextually related to the requested term. The user device may modify the search result by replacing the first term of the search result with the requested term. The user device may use NLP to determine that the first term of the search result that may be contextually related to the requested term. The user device may use an ontology to determine that the first term of the search result that may be contextually related to the requested term. The user device may use a user profile to determine that the first term of the search may be contextually related to the requested term. The user profile may indicate characteristics and/or preferences of a user of the user device.

At step 850, the modified search result may be output by a computing device (e.g., by the user device 102, the computing device 104, the search engine 118, and/or the language processing device 120 of FIG. 1). The computing device may send the modified search result to another device (e.g., the user device 102). The computing device may cause output of the modified search result on a display.

Figure 9:
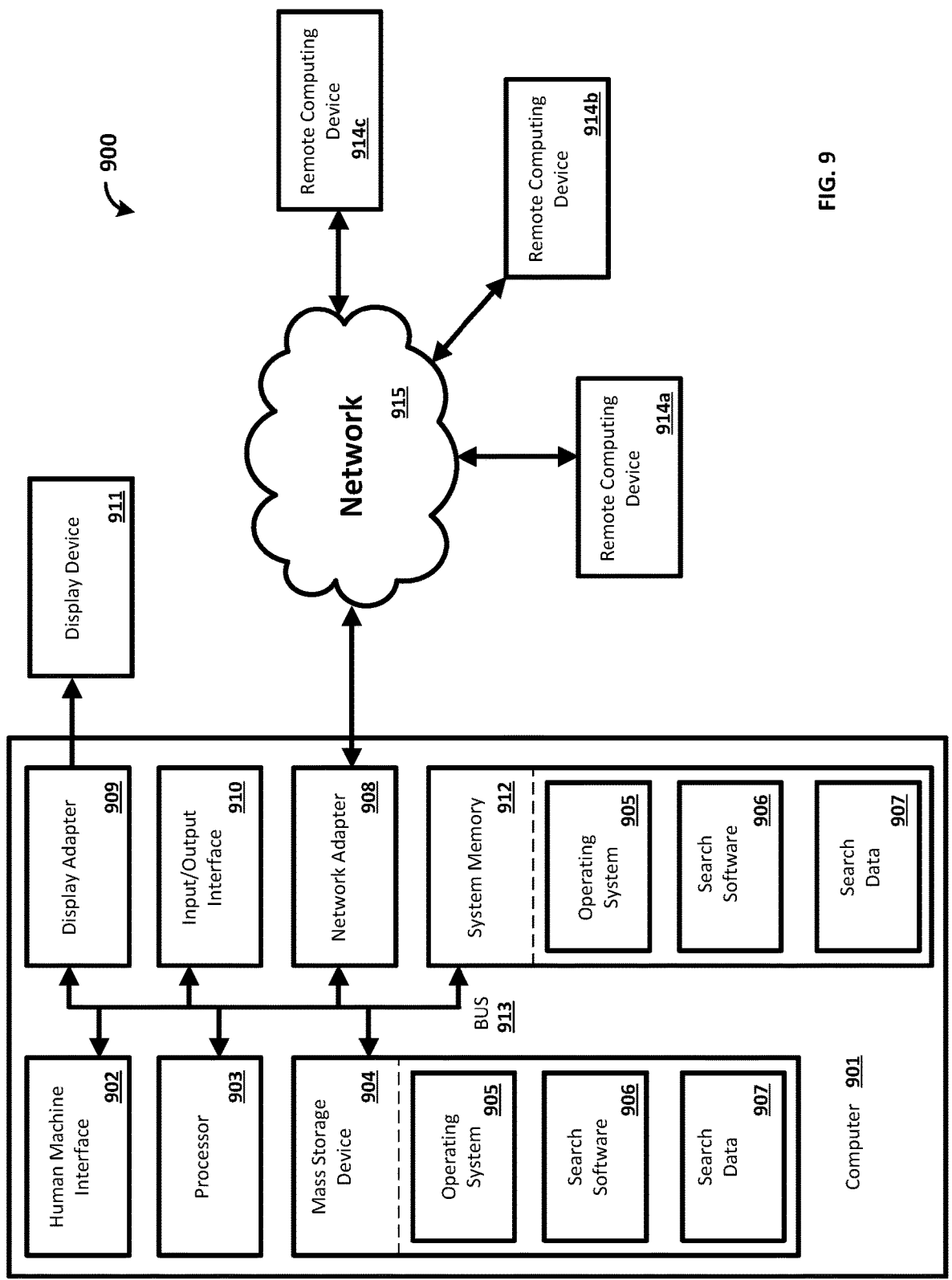
FIG. 9 shows a block diagram of a computing device for modifying terminology.

FIG. 9 shows a system 900 for modifying terminology. The user device 102, the computing device 104, the search engine 108, or the language processing device 120 of FIG. 1 may be a computer 901 as shown in FIG. 9.

The computer 901 may comprise one or more processors 903, a system memory 912, and a bus 913 that couples various components of the computer 901 including the one or more processors 903 to the system memory 912. In the case of multiple processors 903, the computer 901 may utilize parallel computing.

The bus 913 may comprise one or more of several possible types of bus structures, such as a memory bus, memory controller, a peripheral bus, an accelerated graphics port, and a processor or local bus using any of a variety of bus architectures.

The computer 901 may operate on and/or comprise a variety of computer readable media (e.g., non-transitory). Computer readable media may be any available media that is accessible by the computer 901 and comprises, non-transitory, volatile and/or non-volatile media, removable and non-removable media. The system memory 912 has computer readable media in the form of volatile memory, such as random access memory (RAM), and/or non-volatile memory, such as read only memory (ROM). The system memory 912 may store data such as search data 907 and/or program modules such as operating system 905 and search software 906 that are accessible to and/or are operated on by the one or more processors 903.

The computer 901 may also comprise other removable/non-removable, volatile/non-volatile computer storage media. The mass storage device 904 may provide non-volatile storage of computer code, computer readable instructions, data structures, program modules, and other data for the computer 901. The mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 904. An operating system 905 and search software 906 may be stored on the mass storage device 904. One or more of the operating system 905 and search software 906 (or some combination thereof) may comprise program modules and the search software 906. Search data 907 may also be stored on the mass storage device 904. Search data 907 may be stored in any of one or more databases known in the art. The databases may be centralized or distributed across multiple locations within the network 915.

A user may enter commands and information into the computer 901 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 903 via a human machine interface 902 that is coupled to the bus 913, but may be connected by other interface and bus structures, such as a parallel port, game port, an IEEE 1394 Port (also known as a Firewire port), a serial port, network adapter 908, and/or a universal serial bus (USB).

A display device 911 may also be connected to the bus 913 via an interface, such as a display adapter 909. It is contemplated that the computer 901 may have more than one display adapter 909 and the computer 901 may have more than one display device 911. A display device 911 may be a monitor, an LCD (Liquid Crystal Display), light emitting diode (LED) display, television, smart lens, smart glass, and/or a projector. In addition to the display device 911, other output peripheral devices may comprise components such as speakers (not shown) and a printer (not shown) which may be connected to the computer 901 via Input/Output Interface 910. Any step and/or result of the methods may be output (or caused to be output) in any form to an output device. Such output may be any form of visual representation, including, but not limited to, textual, graphical, animation, audio, tactile, and the like. The display 911 and computer 901 may be part of one device, or separate devices.

The computer 901 may operate in a networked environment using logical connections to one or more remote computing devices 914a,b,c. A remote computing device 914a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 901 and a remote computing device 914a,b,c may be made via a network 915, such as a local area network (LAN) and/or a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components may reside at various times in different storage components of the computing device 901, and are executed by the one or more processors 903 of the computer 901. An implementation of search software 906 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
receiving, by a computing device from a user device, a search query that comprises a search term; and
causing output of a modified search result, wherein the modified search result comprises the search term as a replacement for a term of a search result associated with the search query.

2. The method of claim 1, further comprising determining, based on the search query, the search result.

3. The method of claim 1, further comprising determining, based on replacement of the term of the search result with the search term of the search query, the modified search result.

4. The method of claim 1, wherein the modified search result is based on at least one demographic of a user associated with the user device.

5. The method of claim 1, further comprising determining the term of the search query is contextually related to the term of the search result.

6. The method of claim 1, further comprising determining, based on natural language processing, the term of the search result.

7. The method of claim 1, wherein causing the output of the modified search result comprises sending, to the user device, the modified search result.

8. An apparatus comprising:
one or more processors; and
memory storing processor-executable instructions that, when executed by the one or more processors, cause the apparatus to:
receive, from a user device, a search query that comprises a search term; and
cause output of a modified search result, wherein the modified search result comprises the search term as a replacement for a term of a search result associated with the search query.

9. The apparatus of claim 8, wherein the processor-executable instructions, when executed by the one or more processors, further cause the apparatus to determine, based on the search query, the search result.

10. The apparatus of claim 8, wherein the processor-executable instructions, when executed by the one or more processors, further cause the apparatus to determine, based on replacement of the term of the search result with the search term of the search query, the modified search result.

11. The apparatus of claim 8, wherein the modified search result is based on at least one demographic of a user associated with the user device.

12. The apparatus of claim 8, wherein the processor-executable instructions, when executed by the one or more processors, further cause the apparatus to determine the term of the search query is contextually related to the term of the search result.

13. The apparatus of claim 8, wherein the processor-executable instructions, when executed by the one or more processors, further cause the apparatus to determine, based on natural language processing, the term of the search result.

14. The apparatus of claim 8, wherein the processor-executable instructions that, when executed by the one or more processors, cause the apparatus to cause the output of the modified search result, cause the apparatus to send, to the user device, the modified search result.

15. One or more non-transitory computer-readable media storing processor-executable instructions that, when executed by at least one processor, cause the at least one processor to:
- receive, from a user device, a search query that comprises a search term; and
- cause output of a modified search result, wherein the modified search result comprises the search term as a replacement for a term of a search result associated with the search query.

16. The one or more non-transitory computer-readable media of claim 15, wherein the processor-executable instructions, when executed by the at least one processor, further cause the at least one processor to determine, based on the search query, the search result.

17. The one or more non-transitory computer-readable media of claim 15, wherein the processor-executable instructions, when executed by the at least one processor, further cause the at least one processor to determine, based on replacement of the term of the search result with the search term of the search query, the modified search result.

18. The one or more non-transitory computer-readable media of claim 15, wherein the modified search result is based on at least one demographic of a user associated with the user device.

19. The one or more non-transitory computer-readable media of claim 15, wherein the processor-executable instructions, when executed by the at least one processor, further cause the at least one processor to determine the term of the search query is contextually related to the term of the search result.

20. The one or more non-transitory computer-readable media of claim 15, wherein the processor-executable instructions, when executed by the at least one processor, further cause the at least one processor to determine, based on natural language processing, the term of the search result.

21. The one or more non-transitory computer-readable media of claim 15, wherein the processor-executable instructions that, when executed by the at least one processor, cause the at least one processor to cause the output of the modified search result, cause the at least one processor to send, to the user device, the modified search result.

22. A system comprising:
- a computing device comprising memory storing processor-executable instructions that, when executed by one or more processors of the computing device, cause the computing device to:
  - receive, from a user device, a search query that comprises a search term; and
  - cause output of a modified search result, wherein the modified search result comprises the search term as a replacement for a term of a search result associated with the search query;

and
- the user device comprising memory storing processor-executable instructions that, when executed by one or more processors of the user device, cause the user device to send the search query.

23. The system of claim 22, wherein the processor-executable instructions further cause the computing device to determine, based on the search query, the search result.

24. The system of claim 22, wherein the processor-executable instructions further cause the computing device to determine, based on replacement of the term of the search result with the search term of the search query, the modified search result.

25. The system of claim 22, wherein the modified search result is based on at least one demographic of a user associated with the user device.

26. The system of claim 22, wherein the processor-executable instructions further cause the computing device to determine the term of the search query is contextually related to the term of the search result.

27. The system of claim 22, wherein the processor-executable instructions further cause the computing device to determine, based on natural language processing, the term of the search result.

28. The system of claim 22, wherein the processor-executable instructions that cause the computing device to cause the output of the modified search result further cause the computing device to send, to the user device, the modified search result.

* * * * *